United States Patent [19]

Harwood et al.

[11] Patent Number: 4,909,348
[45] Date of Patent: Mar. 20, 1990

[54] STAMP FORMED EXHAUST MUFFLER WITH CONFORMAL OUTER SHELL

[75] Inventors: Jon W. Harwood; Walter G. Moring, III, both of Toledo, Ohio; Paul E. Larkins, Temperance, Mich.

[73] Assignee: AP Parts Manufacturing Company, Toledo, Ohio

[21] Appl. No.: 267,818

[22] Filed: Nov. 7, 1988

Related U.S. Application Data

[63] Continuation-in-part of Ser. No. 146,032, Jan. 20, 1988, Pat. No. 4,821,840.

[51] Int. Cl.$^4$ .......................... F01N 1/02; F01N 7/18
[52] U.S. Cl. .................................. 181/282; 181/228; 181/232; 181/238; 181/243; 181/250; 181/268; 181/272; 181/273
[58] Field of Search ............... 181/204, 212, 238, 240, 181/228, 230, 243, 250, 232, 268, 272, 273, 282

[56] References Cited

U.S. PATENT DOCUMENTS

| | | |
|---|---|---|
| 705,357 | 7/1902 | Keating . |
| 1,110,040 | 9/1914 | Chatain . |
| 2,484,826 | 10/1949 | Harley . |
| 2,484,827 | 10/1949 | Harley . |
| 2,658,580 | 11/1953 | Trembley . |
| 2,860,722 | 11/1958 | Gerstung . |
| 2,902,109 | 9/1959 | Burgess et al. . |
| 2,943,695 | 7/1960 | Jeffords .................... 181/243 |
| 3,125,182 | 3/1964 | Earley . |
| 3,140,755 | 7/1964 | Tranel ........................ 181/282 |
| 3,158,222 | 11/1964 | Richmond .................. 181/273 |
| 3,176,791 | 4/1965 | Betts et al. ................. 181/260 |
| 3,198,284 | 8/1965 | Powers . |
| 3,220,508 | 11/1965 | Nordquest et al. . |
| 3,412,825 | 11/1968 | Hall . |
| 3,638,756 | 2/1972 | Thiele ......................... 181/245 |
| 3,650,354 | 3/1972 | Gordon . |
| 3,709,320 | 1/1973 | Höllerl et al. . |
| 3,827,529 | 8/1974 | Frietzsche et al. . |
| 3,852,041 | 12/1974 | Moore et al. . |
| 4,108,274 | 8/1978 | Snyder ....................... 181/229 |
| 4,109,751 | 8/1978 | Kabele ....................... 181/247 |
| 4,132,286 | 1/1979 | Hasui et al. ................ 181/265 |
| 4,165,798 | 8/1979 | Martinez .................... 181/268 |
| 4,396,090 | 8/1983 | Wolfhugel .................. 181/282 |
| 4,415,059 | 11/1983 | Hayashi ..................... 181/250 |
| 4,418,790 | 12/1983 | Agnew ....................... 181/268 |
| 4,422,519 | 12/1983 | Nomura et al. ............ 181/228 X |
| 4,456,091 | 6/1984 | Blanchot .................... 181/282 X |
| 4,487,288 | 12/1984 | Watanabe et al. ......... 181/238 |
| 4,523,660 | 6/1985 | Gaddi ......................... 180/228 |
| 4,700,806 | 10/1987 | Harwood .................... 181/282 |
| 4,759,423 | 7/1988 | Harwood et al. .......... 181/282 |
| 4,760,894 | 8/1988 | Harwood et al. .......... 181/282 |
| 4,765,437 | 8/1988 | Harwood et al. .......... 181/282 |

FOREIGN PATENT DOCUMENTS

| | | |
|---|---|---|
| 59-155528 | 9/1984 | Japan . |
| 59-43456 | 12/1984 | Japan . |
| 60-111011 | 6/1985 | Japan . |
| 61-155625 | 7/1985 | Japan . |
| 61-14565 | 5/1986 | Japan . |
| 61-108821 | 5/1986 | Japan . |
| 632013 | 1/1950 | United Kingdom . |
| 1012463 | 12/1965 | United Kingdom . |
| 2120318 | 11/1983 | United Kingdom . |

*Primary Examiner*—B. R. Fuller
*Attorney, Agent, or Firm*—Anthony J. Casella; Gerald E. Hespos

[57] ABSTRACT

A stamp formed exhaust muffler for mounting on a vehicle is provided. The muffler comprises a plurality of plates secured in juxtaposed relationship and stamp formed to define an array of tubes therebetween. At least one external shell is secured to the internal plates to define at least one chamber which communicates with the array of tubes. The external shell includes at least one conformal area which permits the muffler to conform to the shape of a structure on the vehicle. The conformal area may be an area of generally arcuate concavity when viewed from the exterior of the muffler or may define an internal corner on the muffler. Thus, a plane or line connecting two locations on the conformal area of the external shell will pass through the interference zone of a structure on the vehicle. The conformal area may be disposed where peripheral edges of the formed components are joined.

18 Claims, 10 Drawing Sheets

STAMP FORMED EXHAUST MUFFLER WITH CONFORMAL OUTER SHELL

RELATED APPLICATIONS

This application is a continuation-in-part of application Ser. No. 146,032 which was filed on Jan. 20, 1988, U.S. Pat. No. 4,821,840.

BACKGROUND OF THE INVENTION

Prior art vehicular exhaust mufflers typically comprise an array of parallel tubes supported by transversely extending baffles and mounted within a generally tubular outer shell of circular or oval cross section. The array of tubes in the prior art muffler typically comprises an inlet tube connectable to the exhaust pipe coming from the engine, an outlet tube connectable to the tail pipe and one or more additional tubes to provide communication between the inlet and outlet. The baffles of the prior art muffler typically conform to the cross-sectional shape of the outer shell such that the baffles and the outer shell define a plurality of chambers within the muffler. The pipes disposed in the prior art muffler communicate with one or more of the chambers. For example, certain pipes extending through a chamber might be perforated or louvered to allow the exhaust gases to expand into the chamber and/or to permit a controlled amount of cross flow between two perforated tubes in the expansion chamber. The prior art muffler could also include a tuning tube extending into an at least partly enclosed low frequency resonating chamber for the purpose of attenuating a fairly narrow range of low frequency noise.

The noise and pressure characteristics of exhaust gases vary widely from one engine type to another. Thus, exhaust mufflers are carefully engineered for each vehicle engine type to ensure that the muffler attenuates noise properly for its intended vehicle and achieves the specified levels of noise and back pressure. The parameters that affect these performance characteristics include the cross-sectional area of the tubes within the muffler, the cross-sectional area encompassed by perforations or louvers, the length and cross-sectional dimensions of tuning tubes, the volume of the various low frequency resonating chambers and expansion chambers and so forth.

In addition to the acoustical design parameters, automotive engineers must contend with the limited available space on the vehicle. In particular, other structures on the vehicle such as the gas tank, the passenger compartments, the trunk and spare tire well, the drive train and suspension components typically have set volume and location requirements that limit the number, the size and the shape of the locations available for the muffler. Additionally, most automobile manufacturers establish sight lines and ramp clearances above which all structural components, including the exhaust system, must be disposed. These various space limitations and controls have imposed servere design constraints and limitations on the manufacturer of the prior art mufflers. In particular, the muffler manufacturer could alter the length of the prior art muffler to fit the available space and could select an appropriate size oval or circular cross section in an attempt to match the space envelope on the vehicle. However, in virtually all situations, the manufacturer of the prior art muffler was limited to generally rectangular top, bottom and side plan view configurations of the muffler and a circular or oval transverse cross section. As a general rule, it becomes increasingly more difficult to achieve specified noise and back pressure levels as the volume or size of the muffler is decreased. Smaller mufflers tend to increase back pressure and limit the number of acoustical tuning options that are available.

The prior art includes various stamp formed mufflers. Many of these prior art stamp formed mufflers have comprised a pair of stamp formed plates secured in juxtaposed relationship, with the stamp forming defining a circuitous route for the exhaust gases to follow. The particular circuitous route of these prior art stamp formed mufflers was intended to attenuate the exhaust gas noise. Examples of such prior art mufflers include U.S. Pat. No. 2,484,827 which issued to Harley on Oct. 18, 1949 and U.S. Pat. No. 3,638,756 which issued to Thiele on Feb. 1, 1972. Other prior art stamp formed mufflers have included at least one pair of stamped internal plates which define tubes and/or baffles and a pair of stamped external shells to define an enclosure around the internal plates. Prior art mufflers of this general construction are shown in: U.S. Pat. No. 4,132,286 which issued to Hasui et al on Jan. 2, 1979; U.S. Pat. No. 4,456,091 which issued to Blanchot on Jun. 26, 1984; and British Pat. No. 632,013 which issued in 1949. Other prior art mufflers have included stamp formed external shells with internal components comprising both tubular and stamp formed components, such as the muffler shown in Japanese Pat. No. 59-43456, while still others have included stamp formed internal components with conventional wrapped outer shells, such as the muffler shown in U.S. Pat. No. 4,396,090 which issued to Wolfhugel on Aug. 2, 1983.

Recently there have been several significant engineering improvements in mufflers fabricated from a plurality of formed sheets of metal. In particular, the metal sheets of these mufflers are appropriately deformed by available processes such as stamp forming, hydroforming, explosion forming or magnetic forming. For example, a formed muffler with an array of tubes including a tuning tube and with a low frequency resonating chamber and expansion chambers is shown in U.S. Pat. No. 4,700,806 which issued to Jon Harwood on Oct. 20, 1987 and which is assigned to the assignee of the subject invention. The mufflers shown and described in U.S. Pat. No. 4,700,806 afford many engineering and manufacturing advantages in view of their stamp formed construction, while also achieving sound attenuation options that had not previously been available with stamp formed mufflers. The disclosure of U.S. Pat. No. 4,700,806 is incorporated herein by reference.

As noted above, the prior art conventional muffler formed with tubular internal components, baffles and a wrapped outer shell is typically of generally rectangular configuration in its top, bottom and side plan views and oval or circular in transverse cross-section. Also as noted above, this limitation on the shape of the muffler has created significant challenges to the automotive engineers attempting to design the exhaust system within the limited space envelopes on the vehicle. The above described prior art stamp formed mufflers have also generally conformed to this rectangular plan view configuration to define a generally convex polyhedral external shape. However, certain of these prior art stamp formed mufflers have somewhat softened the polyhedral configuration with tapers at the opposed ends, such as in the above referenced U.S. Pat. No.

3,638,756 and U.S. Pat. No. 4,132,286. U.S. Pat. No. 4,700,806 also shows that the rectangular side elevational view can be altered with a tapered end wall.

Further advancements in muffler construction are shown in co-pending patent application Ser. No. 061,876 which was filed by Jon Harwood et al on Jun. 11, 1987 and is now U.S. Pat. No. 4,760,896 which is directed to an exhaust muffler with angularly aligned inlets and outlets. In particular, co-pending application Ser. No. 061,876 shows a generally polyhedral exhaust muffler of generally pentagonal top plan view configuration achieved by truncating one corner of an otherwise rectangular top plan view to enable the muffler to be placed in proximity to the differential of a rear wheel drive vehicle. Co-pending application Ser. No. 061,876 further shows that the stamp formed construction enables the inlets and outlets of the muffler to be angularly aligned relative to one another and relative to the centerline of the muffler, and further enables at least one inlet or outlet to extend from the top or bottom of the muffler, thereby obviating the need for long tubular bends and enabling the muffler to be placed in closer proximity to other structures on the vehicle. A similar disposition of a muffler inlet and/or outlet is shown in co-pending application Ser. No. 061,913 which also was filed by Jon Harwood on Jun. 11, 1987 and is now U.S. Pat. No. 4,759,423 which is directed to the tube and chamber construction for an exhaust muffler. These co-pending applications are assigned to the assignee of the subject invention and their disclosures are incorporated herein by reference.

Several of the above identified prior art references show stamp formed mufflers where the external shells include indentations to achieve or contribute to a particular required circuitous flow of exhaust gases. For example, the above described U.S. Pat. No. 4,700,806 and the co-pending applications all show formed mufflers wherein the external shells include creases or indentations which extend into contact with the internal plates to define chambers surrounding the array of tubes in the muffler.

Despite the significant recent advances in stamp formed mufflers, the mufflers have defined an exterior profile or space envelope, relative to other parts of the vehicle, of generally convex polyhedral shape. It is now realized that this geometric limitation may create difficulties in attempting to position an acoustically acceptable muffler within the limited space on a vehicle.

In view of the above, it is an object of the subject invention to provide a muffler comprising a plurality of stamp formed components configured to conform closely to the shape of other structures on the vehicle.

It is another object of the subject invention to provide a muffler having a plurality of stamp formed external shells, at least one of which is stamped to conform to the available space on a vehicle.

An additional object of the subject invention is to provide a muffler having at least one stamped external shell which is generally concave in configuration and conformal with respect to at least one other structural component on a vehicle.

A further object of the subject invention is to provide a vehicular exhaust muffler having a plurality of external shells, at least one of which is concave to substantially follow an interference zone surrounding at least one other structural component on a vehicle.

Still a further object of the subject invention is to provide an exhaust muffler having at least one external shell configured to at least partly surround another structure on the vehicle.

SUMMARY OF THE INVENTION

The subject invention is directed to a muffler comprising a plurality of formed sheet metal components. Typically, the metal sheets are formed by stamping, but other known forming methods can be employed, such as hydroforming, explosion forming or magnetic forming. As used herein, the terms forming and/or stamp forming are considered to comprise all such forming methods where forces are applied to a sheet to achieve a specified form. The muffler may comprise a pair of plates secured in juxtaposed relationship and formed to define an array of tubes therebetween. The plates may initially be separate, or may be a single plate folded onto itself. The array of tubes comprises at least one inlet and at least one outlet to the muffler. Selected locations on the plates may be formed to include perforations, louvers or apertures which permit a controlled flow of exhaust gases from the array of tubes at locations between the inlet and outlet.

The muffler further comprises at least one external shell secured to the plates. The external shell is formed to define at least one chamber surrounding selected portions of the plates, such as portions that have been stamped to include perforations, louvers, apertures or the like. In certain embodiments the muffler may comprise a pair of stamp formed plates secured in face-to-face relationship and a pair of stamp formed external shells secured to and surrounding the plates.

At least one external shell has a portion which is of generally concave conformal configuration with respect to at least one other nonplanar or polyhedral structure on the vehicle. In this context, "conformal" is defined as conforming to the shape of some other nonplanar structure on the underside of the vehicle or the interference zone specified for that other structure. Also in this context "concave" is intended to encompass both an inwardly directed arcuate surface or an inwardly directed area defined by two intersecting surfaces such as on a concave polyhedron. Thus, the concave conformally configured external shell of the muffler will effectively surround a generally convex portion of the other structure on the vehicle or the interference zone of that other structure. With this construction, a line or plane connecting spaced apart locations of the conformal area of the external shell will pass through either another structure on the vehicle or the interference zone surrounding such other structure. More particularly, a line or a plane connecting the extremes of the conformal area on the muffler may pass through an unrelated structure on the vehicle or through the interference zone of that structure.

To clarify the configuration of the subject muffler, it must be noted that in this context the muffler is not considered to comprise the inlet or outlet nipples extending therefrom and that the conformal area does not include an inlet or outlet nipple of the muffler. Additionally, the other structures of the vehicle to which the subject muffler conforms in shape do not include mounting brackets and other such hardware for securing the muffler to the vehicle. In this regard, the prior art does show both conventional and stamp formed mufflers where a mounting bracket is disposed in the corner defined between an inlet or outlet nipple and an end wall of the muffler.

In certain embodiments the muffler may comprise a pair of internal plates secured in face-to-face relationship to define an inlet and an outlet and a pair of tuning tubes disposed therebetween. The muffler may further comprise a pair of stamp formed external shells. One tuning tube may communicate with a low frequency resonating chamber defined by one external shell and one internal plate, while the other tuning tube may communicate with a low frequency resonating chamber defined by the other internal plate and the other external shell. This muffler may be configured to be disposed generally in line with the drive shaft of the vehicle. Thus, the stamp formed external shell which will be disposed generally in face-to-face relationship with the underside of the vehicle will be stamp formed to define an elongated concave portion to conform to the shape of the drive shaft and the interference zone surrounding the drive shaft. This concave portion may terminate at two spaced apart generally parallel ridges. The portion of the muffler between these ridges would be spaced inwardly from a line or plane connecting the two ridges. Furthermore, when the muffler is mounted to the vehicle a chordal line or plane connecting these ridges would pass through the interference zone surrounding the drive shaft, and in certain embodiments would extend through the drive shaft as well. Preferably, the muffler would conform to the shape of the interference zone. More particularly, the conformal area of the muffler may be generally uniformly spaced from the drive shaft. This ability to form the external shell to partly surround the drive shaft greatly facilitates the ability to achieve the required volume for the low frequency resonating chamber within the limited available space on the vehicle. As noted above, larger volumes may be critical for achieving specified noise levels without unacceptably raising back pressure. The opposed external shell of the muffler would be facing the road or other surface on which the vehicle is supported, and would not necessarily require a concave configuration. Rather, the other external shell of the muffler would be provided with a configuration to ensure that the entire muffler is within the specified sight lines, achieves the required ramp clearance and is consistent with the desired aerodynamic shape of the vehicle.

Another possible muffler configuration would include a pair of plates stamp formed to define an inlet and outlet and an array of tubes therebetween. The external shells would be stamp formed to generally define a concave polyhedron with an inwardly directed corner which conforms to the shape of the trunk well, the spare tire well or the passenger compartment. This internal corner may be formed by two intersecting generally planar surfaces of the external shell or two distinct arcuate surfaces of the external shell. A line or plane connecting selected locations on these two intersecting surfaces would pass through the trunk well, spare tire well or other such structure on the vehicle or the interference zone surrounding such other structure. For example, the inwardly directed corner may be defined by two generally planar surfaces which extend away from the inwardly directed corner to two respective external or outwardly directed corners. A line connecting these two external corners would pass through the adjacent part of the vehicle or through the interference zone of such adjacent part, and would be spaced away from parts of the muffler therebetween.

In all of the above described embodiments, the concave conformal area may be disposed either entirely within one external shell, or alternatively may comprise the interconnected peripheral portions of two external shells. In certain embodiments plural concave conformal areas may be provided, with at least one concave conformal area being disposed entirely within one of the external shells, and with the interconnected peripheral portions of two external shells defining a second concave conformal area. In this latter embodiment, the first concave conformal area formed entirely in one external shell will be configured to conform to a first convex structure on the vehicle, while the second concave conformal area formed by the interconnected peripheral portions of two external shells will be configured to conform to a second convex structure on the vehicle. In still other embodiments, more than two concave conformal areas may be provided.

DETAILED DESCRIPTION OF THE PREFERRED EMBODIMENTS

Figure 1:
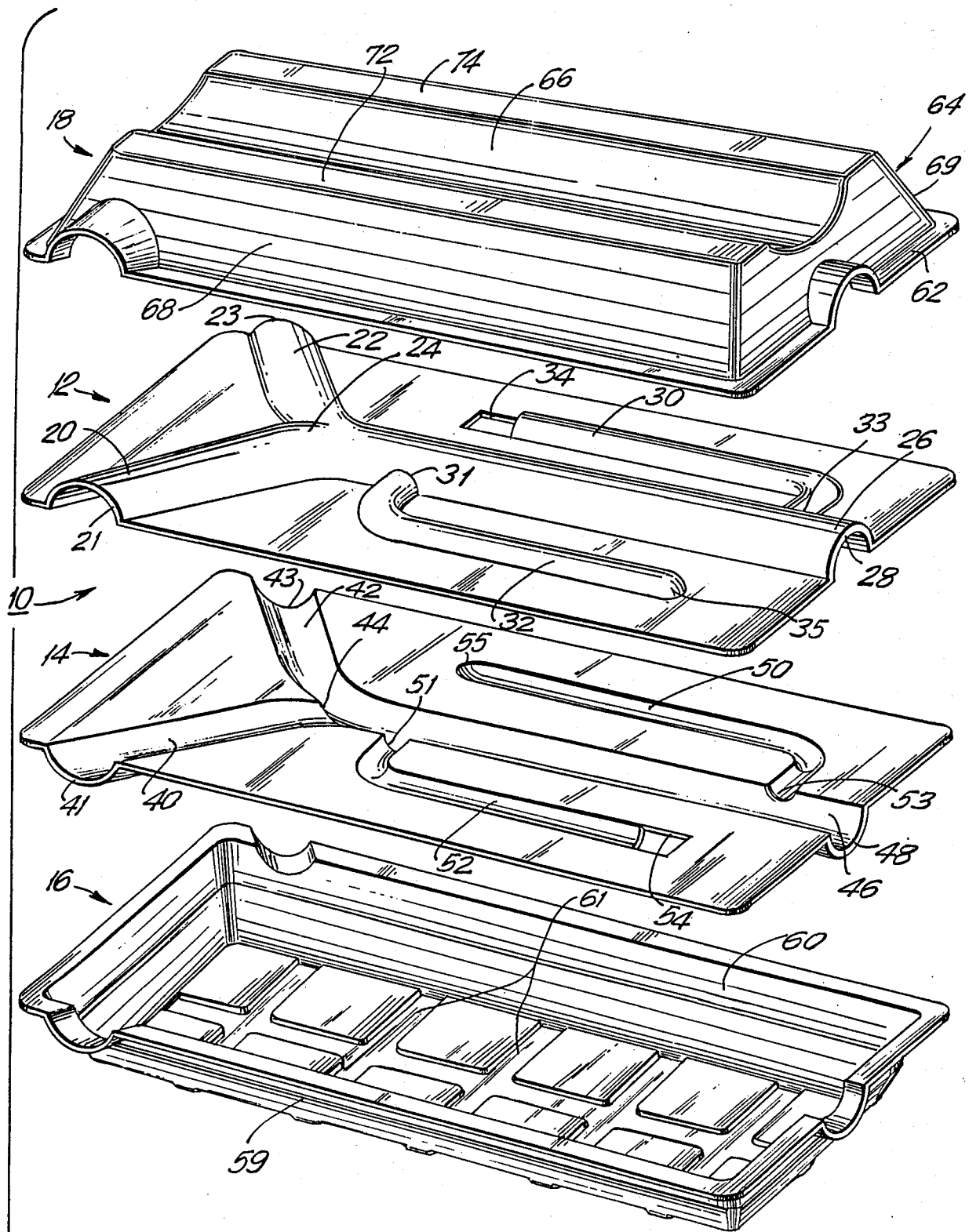
FIG. 1 is an exploded perspective view of a muffler in accordance with the subject invention.
Figure 2:
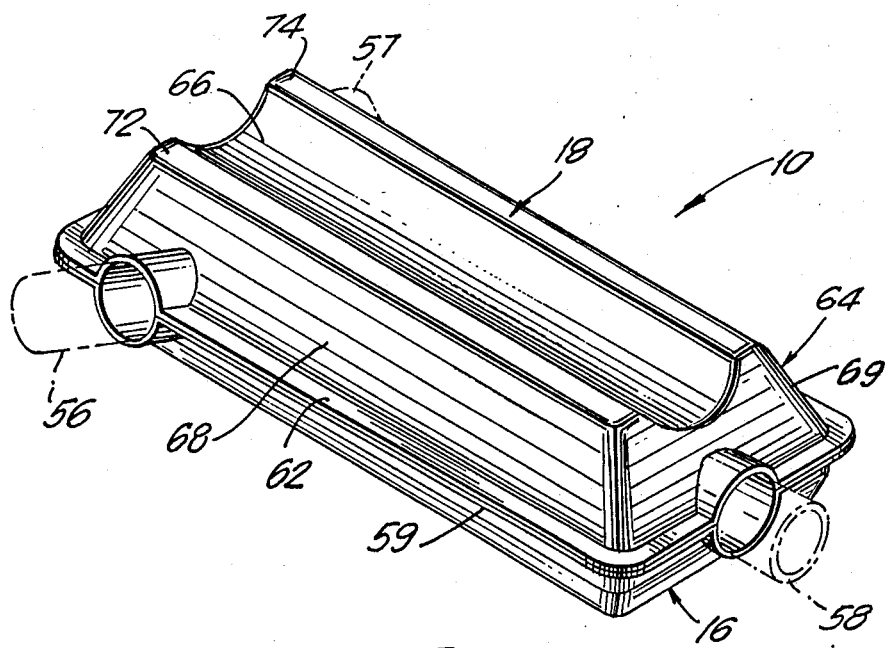
FIG. 2 is a perspective view of the muffler of FIG. 1 shown in its assembled condition.
Figure 3:
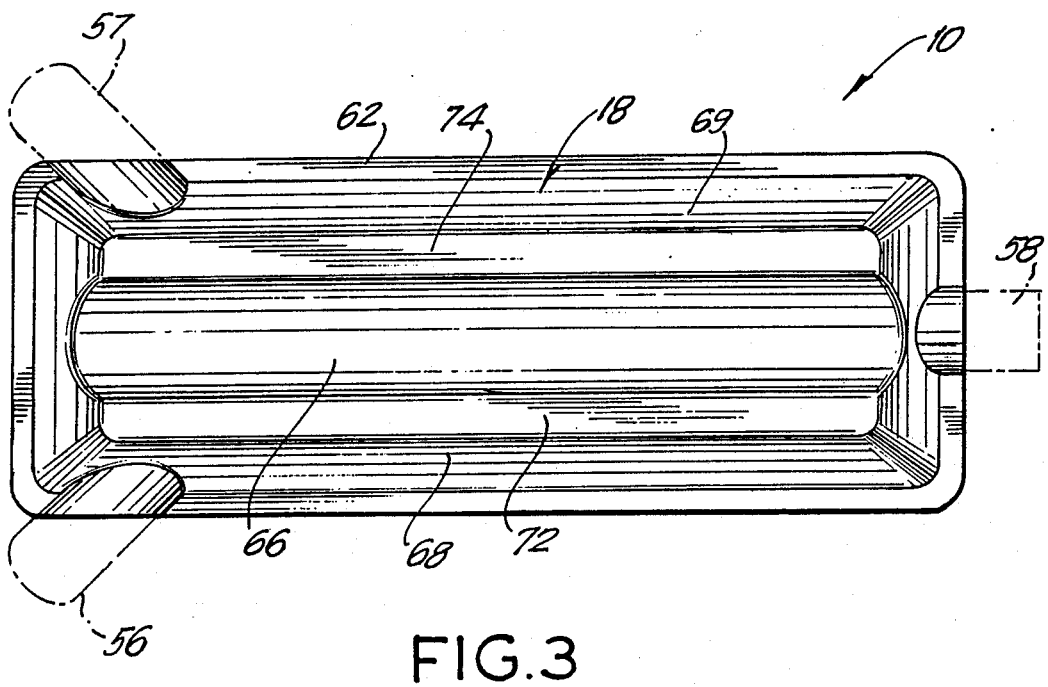
FIG. 3 is a top plan view of the muffler shown in FIG. 2.
Figure 4:
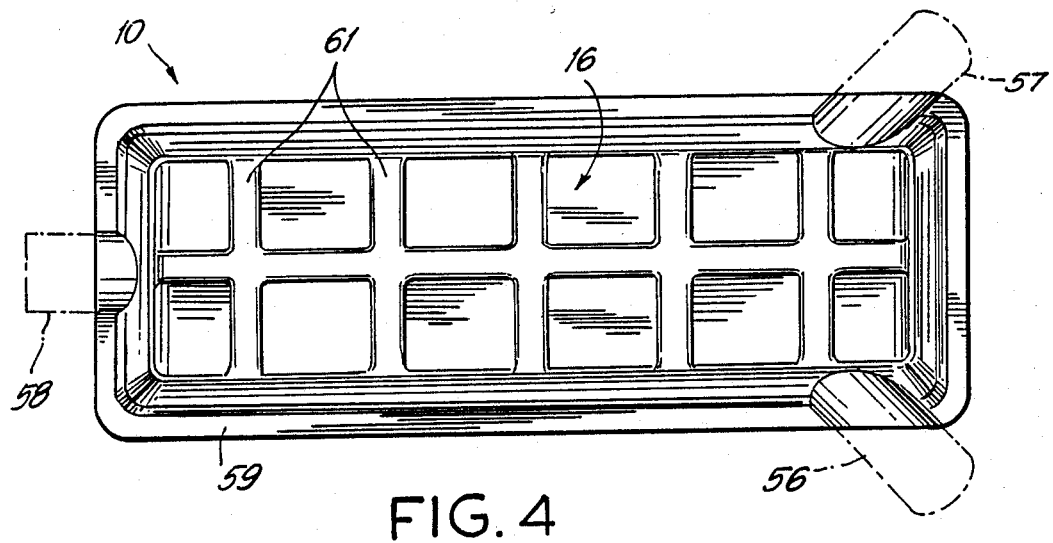
FIG. 4 is a bottom plan view of the muffler shown in FIG. 2.
Figure 5:
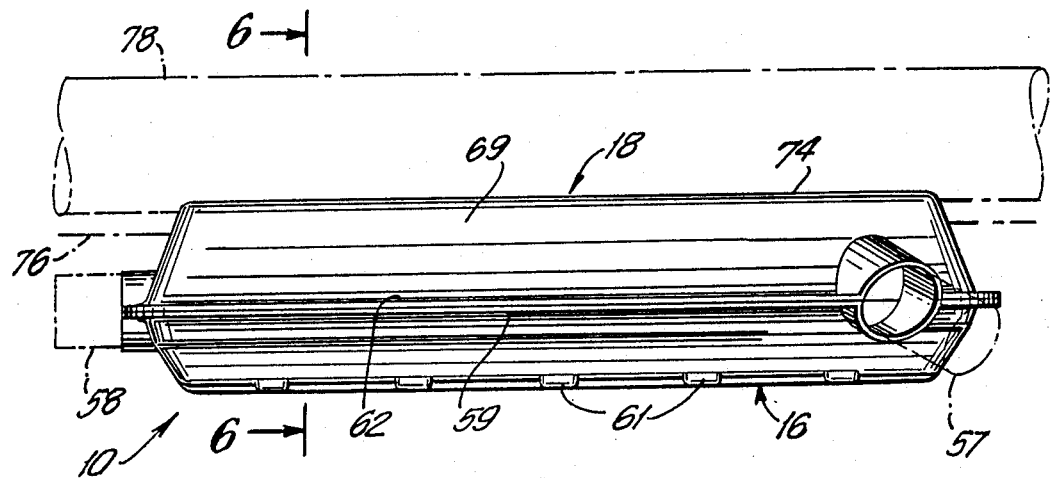
FIG. 5 is a side elevational view of the muffler shown in FIG. 2 and mounted on a vehicle.
Figure 6:
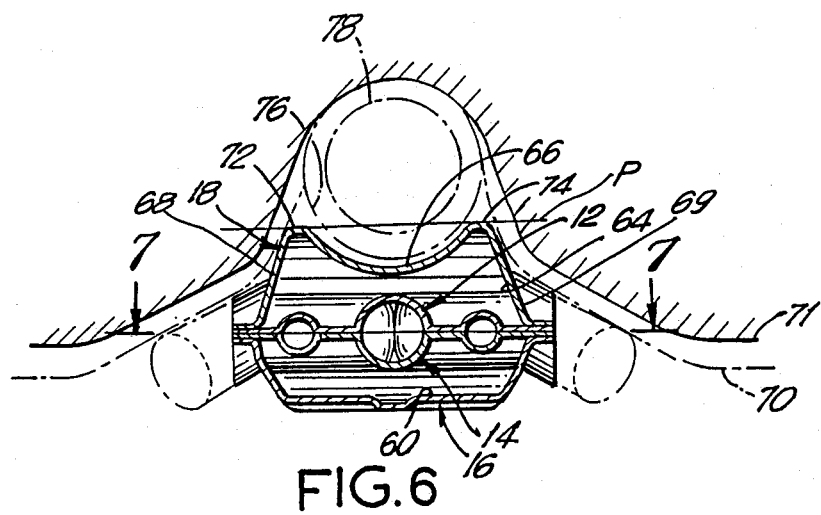
FIG. 6 is a cross section taken along line 6—6 in FIG. 5.
Figure 7:
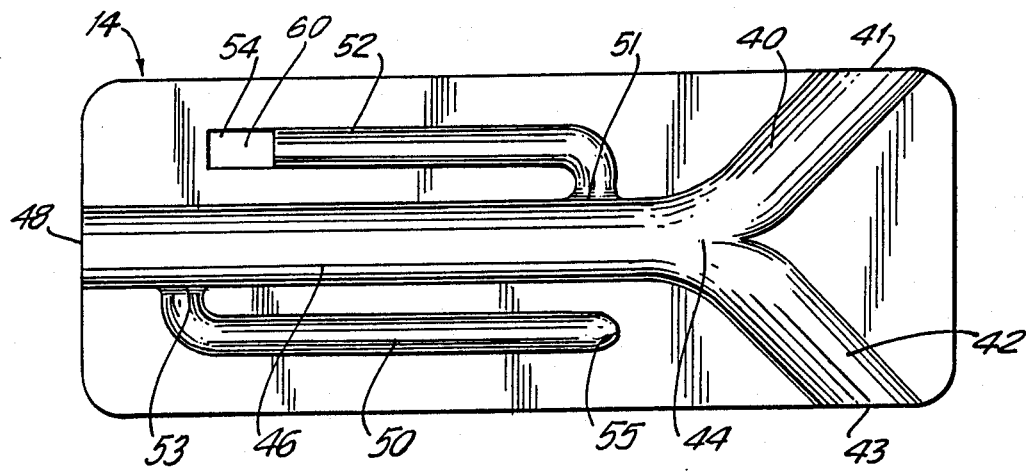
FIG. 7 is a cross-sectional view taken along line 7—7 in FIG. 6.

A muffler in accordance with the subject invention is illustrated in FIGS. 1-7, and is identified generally by the numeral 10. The muffler 10 comprises a pair of internal plates 12 and 14 and a pair of external shells 16 and 18. The muffler 10 is of the type generally referred to as a resonator, and, as explained herein, is operative to attenuate two distinct and relatively narrow frequency ranges of noise. The muffler 10 typically would be employed in combination with at least one other muffler that would be operative to attenuate a generally broader range of exhaust gas noise frequencies. Alternatively, the internal plates 12 and 14 shown herein could be of different configuration to achieve a broader range of sound attenuation.

The internal plate 12 is stamp formed to define a pair of inlet channels 20 and 22 which extend from peripheral locations 21 and 23 on the internal plate 12 toward a confluence 24 at which the inlet channels 20 and 22 communicate with one another. The stamp formed internal plate 12 further comprises an outlet channel 26 which extends from the confluence 24 to peripheral location 28 on the internal plate 12. Tuning channels 30 and 32 communicate with the outlet channel 26 at locations 33 and 31 respectively. The tuning channel 30 terminates at a tuning aperture 34. However, tuning channel 32 defines an enclosed end 35.

The stamped internal plate 14 is dimensioned to be placed in register with the internal plate 12. More particularly, the internal plate 14 includes inlet channels 40 and 42 which extend from peripheral locations 41 and 43 respectively to confluence 44. The internal plate 14 further comprises an outlet tube 46 extending from the confluence 44 to a peripheral location 48. The internal plate 14 is stamp formed to define tuning channels 50 and 52 which extend from the outlet channel 46 at locations 53 and 51 respectively. The tuning channel 52 terminates at a tuning aperture 54, while tuning channel 50 terminates at a closed end 55.

The inlet channels 20 and 22 and the outlet channel 26 of the internal plate 12 are stamped to be in register with the inlet channels 40 and 42 and the outlet channel 46 of the internal plate 14 to define a pair of inlet tubes and an outlet tube which are connectable respectively to nipples 56, 57 and 58 which in turn are connectable to the exhaust pipes and tail pipe of a vehicle. In other embodiments, the tubular members 56, 57 and 58 may comprise portions of the exhaust pipes and tail pipe without the use of separate nipples. The tuning channels 30 and 32 of the internal plate 12 are disposed to be in register with the tuning channels 50 and 52 of the internal plate 14 to define a pair of tuning tubes. The tuning tube defined by tuning channels 30 and 50 communicates with a low frequency resonating chamber through tuning aperture 34 in the internal plate 12. The tuning tube defined by tuning channels 32 and 52 communicates with a separate low frequency resonating chamber 50 through the tuning aperture 54 in the internal plate 14. The length and cross-sectional dimensions of the tuning channels 30, 32, 50 and 52 are carefully selected in accordance with the specific ranges of exhaust gas noise frequency to be attenuated by the muffler 10. Similarly, the volumes of the respective low frequency resonating chambers with which the respective tuning tubes will communicate also will be selected in accordance with the specific noise frequencies to be attenuated.

The external shell 16 includes a peripheral flange 59 which is dimensioned and configured to engage the peripheral portion of the internal plate 14. The portion of the external shell 16 disposed inwardly from the peripheral flange 59 defines a low frequency resonating chamber 60 which will communicate with the tuning aperture 54 stamped in the internal plate 14. The volume defined by the low frequency resonating chamber 60 is selected in view of the length and cross-sectional area of the tuning tube defined by channels 32 and 52 to attenuate a specific range of noise frequencies. It will be noted that the configuration of the low frequency resonating chamber 60 is such that substantially the entire chamber 60 is of convex configuration when viewed from the exterior of the muffler 10. Additionally, it will be noted that the low frequency resonating chamber 60 is characterized by reinforcing ribs 61 which are stamped therein to substantially minimize or prevent the propagation of radiated noise or shell noise.

The external shell 18 includes a peripheral flange 62 which is configured and dimensioned to abut the peripheral portion of the stamped internal plate 12. The external shell 18 is stamp formed to define a low frequency resonating chamber 64 that will communicate with the tuning tube formed by tuning channels 30 and 50 through the tuning aperture 34. The total volume defined by the low frequency resonating chamber 64 of the external shell 18 is selected in view of the particular length and cross-sectional area of the tuning tube defined by channels 30 and 50 and the frequency of the noise to be attenuated.

The low frequency resonating chamber 64, unlike the chamber 60 in the external shell 16, is not uniformly convex when viewed externally. Rather, the low frequency resonating chamber 64 includes an elongated conformal area 66 of generally arcuate concave configuration when viewed from the outside of the muffler 10. More particularly, the low frequency resonating chamber 64 comprises a pair of generally planar walls 68 and 69 extending away from the peripheral flange 62 from opposite longitudinal sides of the external shell 18 and converging toward one another to substantially conform to the shape of the interference zone 70 surrounding the passenger compartment 71. The converging surfaces 68 and 69 terminate at elongated spaced apart ridges 72 and 74. As shown most clearly in FIG. 6, the ridges 72 and 74 are generally convex when viewed from the exterior of the muffler 10 and define generally small radius curves. A chordal plane P extending between the ridges 72 and 74 would be spaced from the conformal area 66 disposed intermediate the ridges 72 and 74. The conformal area 66 is dimensioned and configured to substantially follow the shape of the interference zone 76 surrounding the drive shaft 78 of a vehicle. As a result, the chordal plane P extending between the ridges 72 and 74 would intersect both the interference zone 76 and the drive shaft 78. It will be understood that in certain embodiments the shape of the concave conformal zone may be selected such that a plane comparable to chordal plane P would pass through the interference zone but would be tangent to or slightly spaced from the structure of the vehicle about which the interference zone is disposed.

Figure 8:
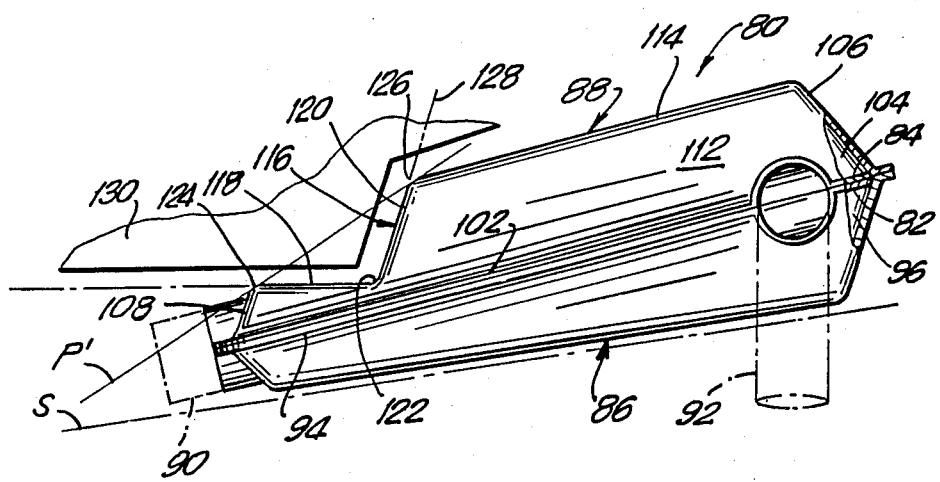
FIG. 8 is an elevational view of an alternate muffler mounted on a vehicle and viewed from the rear of the vehicle.
Figure 9:
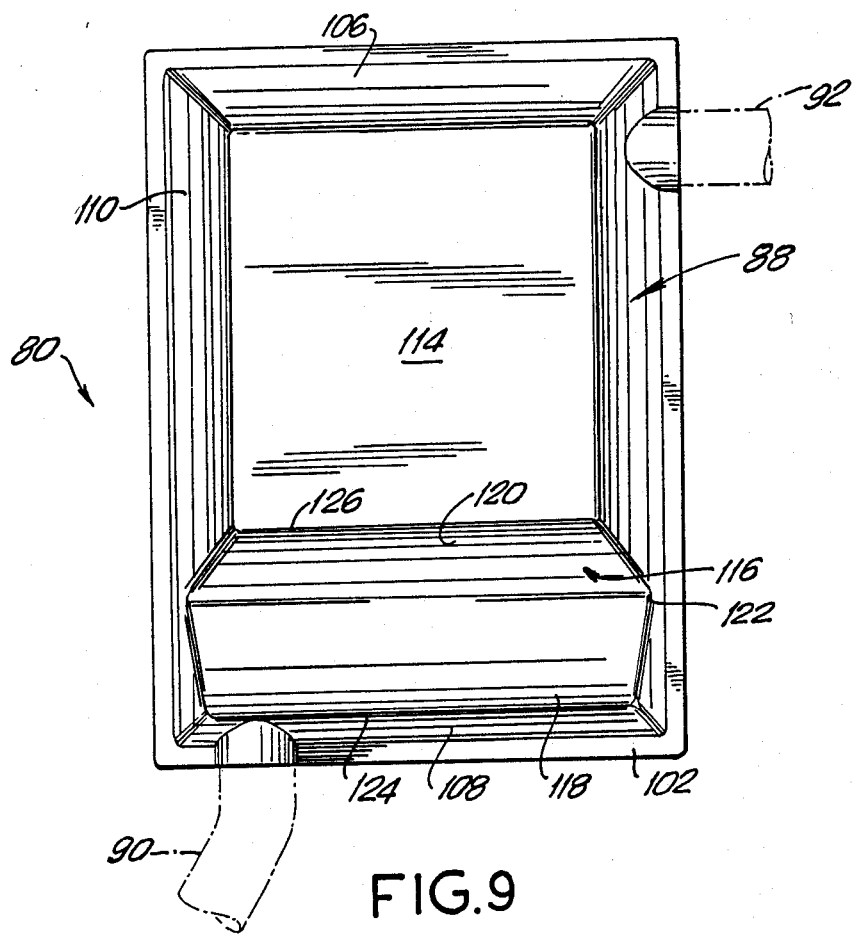
FIG. 9 is a top plan view of the muffler shown in FIG. 8.
Figure 10:
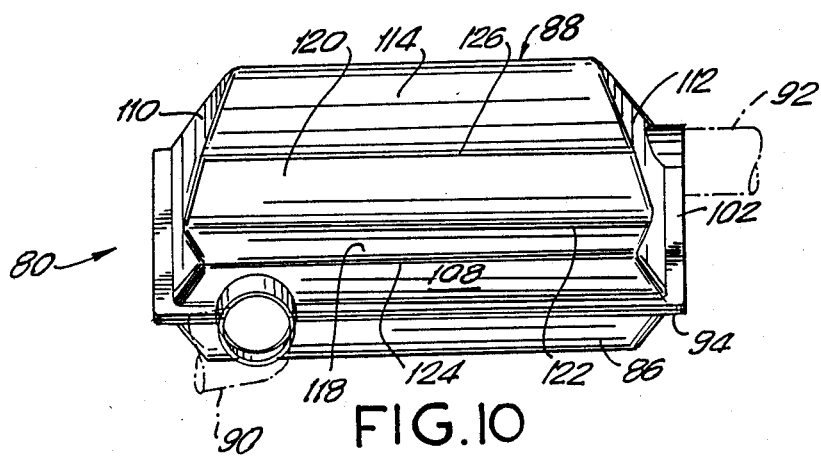
FIG. 10 is a side elevational view of the muffler shown in FIG. 8.
Figure 11:
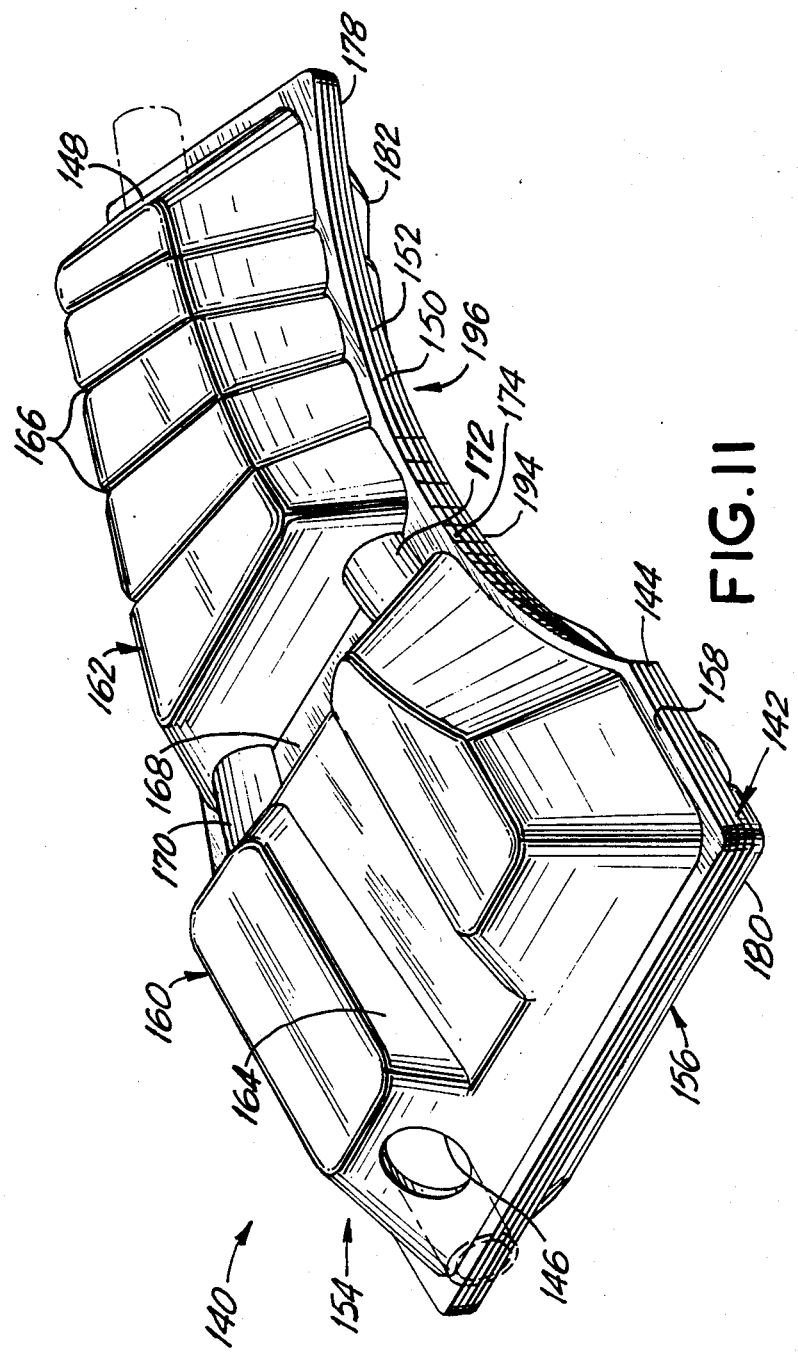
FIG. 11 is a perspective view of a second alternate muffler having a plurality of concave conformal areas.

A second embodiment of a muffler in accordance with the subject invention is illustrated in FIGS. 8–10 and is identified generally by the numeral 80. The muffler 80 may be employed in conjunction with the resonator/muffler 10 described above or may be employed independent of any other muffler. The muffler 80 comprises internal plates 82 and 84 and external shells 86 and 88. The internal plates 82 and 84 are secured in juxtaposed relationship and are stamp formed to define an array of tubes therebetween. The tubes defined by the stamp forming of internal plates 82 and 84 comprise an inlet connectable to nipple 90 or to the exhaust pipe and an outlet connectable to nipple 92 or to the tail pipe. The configuration of the tubes stamped in the internal plates 82 and 84 and disposed intermediate the nipples 90 and 92 will be selected in accordance with the particular noise characteristics of the vehicle onto which the muffler 80 is mounted. For example, the internal plates 82 and 84 may comprise perforations and at least one tuning tube as disclosed in the above identified U.S. Pat. No. 4,700,824 or in the above cited copending applications.

The external shell 86 is disposed to face the road or other surface on which the vehicle is supported. Thus, the external shell 86 defines a profile which generally conforms to the established sight line S for the vehicle and the ramp clearances. The external shell 86 comprises a peripheral flange 94 which is configured and dimensioned to be placed in register with the peripheral portion of the internal plate 82. The remainder of the external shell 86 defines a chamber 96 which is substantially entirely convex when viewed from the exterior of the muffler 80.

The external shell 88 includes a peripheral flange 102 which is configured and dimensioned to be secured to the internal plate 84. The external shell 88 defines a chamber 104 disposed inwardly from the peripheral flange 102. However, the external shell 88 is not substantially uniformly convex when viewed from the exterior of the muffler 80. More particularly, the chamber 104 is defined by opposed generally converging long and short end walls 106 and 108 which converge upwardly from the peripheral flange 102. Opposed side walls 110 and 112 also converge upwardly from the peripheral flange 102 and extend between and connect the end walls 106 and 108. Top wall 114 is connected to the long end wall 106 and portions of the side walls 110 and 112.

The conformal area of the external shell 88 is indicated generally by the numeral 116 and is formed by walls 118 and 120 which intersect at an internal corner 122. More particularly, the walls 118 and 120 diverge from the corner 122 to join with the short end wall 108 and the top wall 114 at external corners 124 and 126 respectively. The configuration of the conformal area 116 is selected to conform to the interference zone 128 which surrounds the structural component 130 of the vehicle on which the muffler 80 is mounted. For example, the structural component 130 may comprise the spare tire well or trunk of the vehicle. With this configuration, a plane P' extending between the corners 124 and 126 will pass through the interference zone 128 of structure 130, and in this particular embodiment will also pass through the structure 130. As noted with the previous embodiment, this configuration enables the muffler 80 to conform to the available space on the vehicle. As a result, the volume required for the chamber 104 can be achieved by efficiently utilizing as much of the odd-shaped available space as is required.

In the above described embodiments, as in the prior art stamp formed mufflers, the external shells were joined to one another at peripheral portions which, in plan view, defined convex shapes, and typically convex polygons. The concave conformity of the above described embodiments existed entirely in the formed chambers extending from a peripheral portion of an external shell. The muffler 140 depicted in FIGS. 11–17 differs from the above described embodiments in that a concave conformal area is disposed at a location on the muffler 140 where peripheral portions thereof are joined. In particular, the muffler 140 comprises internal plates 142 and 144 which are formed to define an array of channels, and which are secured in face-to-face relationship such that an array of tubes is defined by opposed channels of the internal plates 142 and 144. The array of tubes comprises an inlet 146 and an outlet 148. Selected portions of the formed tubes include arrays of perforations, louvers, apertures or the like to permit the expansion or cross flow of exhaust gases as explained above.

Unlike the above described embodiments, the peripheral edges of the internal plates 142 and 144 do not define convex polygons. Rather, the internal plates 142 and 144 comprise edges 150 and 152 respectively which are concave in plan view. The particular concave configuration of the edges 150 and 152 is selected to conform to the shape of a convex structure on the vehicle, such as a spare tire well indicated generally by the numeral 153 in FIG. 12 extending downwardly from the underside of the vehicle.

The muffler 140 further comprises external shells 154 and 156. The external shell 154 includes a generally planar peripheral flange 158 and formed chambers 160 and 162 which extend away from the peripheral flange 158. The chamber 160 is characterized by a generally rectangular concave conformal area 164 which is configured to conform to the shape of a convex structural member on the underside of a vehicle. The chamber 162 includes an array of inwardly directed grooves 166 which are intended to minimize noise or shell ring related to the vibration of the chamber 162. The external shell 154 is further characterized by a crease 168 extending between and separating the chambers 160 and 162. The crease 168 is generally planar, and lies generally within the same plane as the peripheral flange 158. However, the crease 168 is characterized by outwardly extending convex portions 170 and 172 which are disposed and dimensioned to closely engage channels formed in the internal plate 142.

The peripheral flange 158 of the external shell 154 includes a generally arcuate concave conformal portion 174 which lies generally in the same plane as the remainder of the peripheral flange 158, but substantially follows the concave conformal peripheral portions 150 and 152 of the internal plates 142 and 144.

Figure 17:
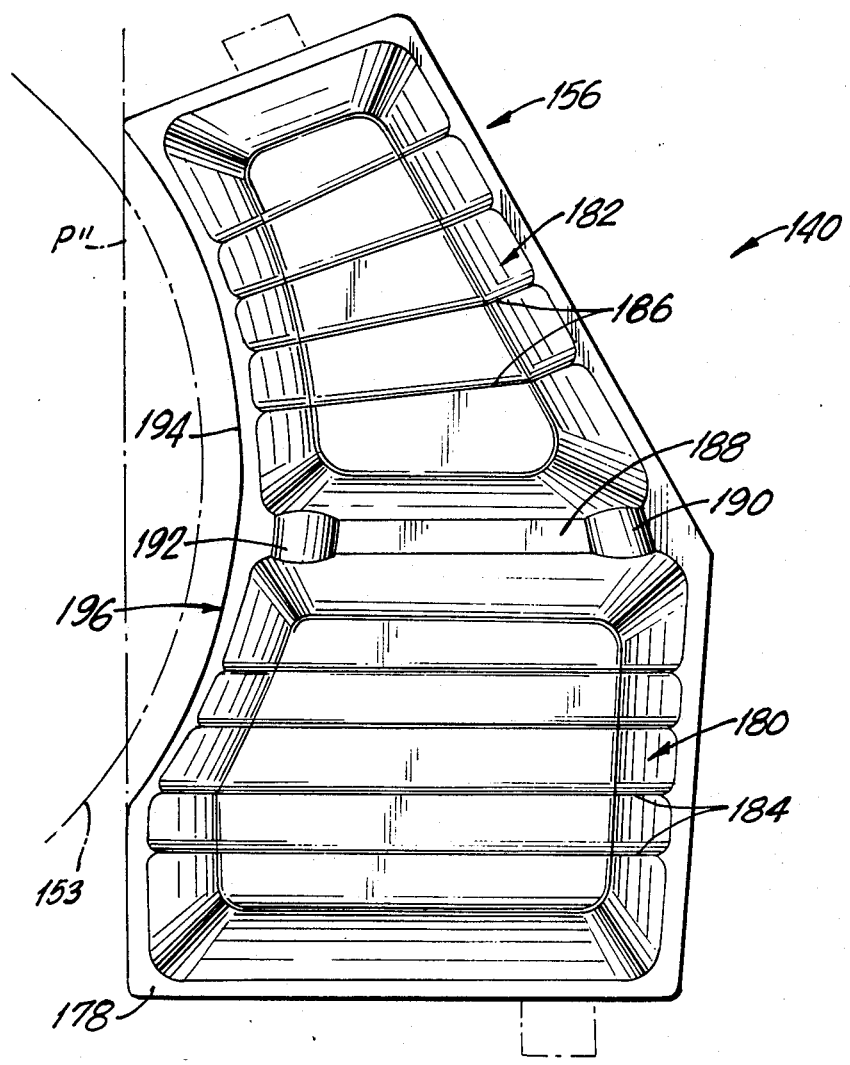
FIG. 17 is a bottom plan view of the muffler shown in FIG. 11.

The external shell 156, as shown most clearly in FIG. 17, includes a generally planar peripheral flange 178 and chambers 180 and 182 extending upwardly from the peripheral flange 178. The chambers 180 and 182 are provided respectively with arrays of reinforcing grooves 184 and 186 for preventing shell ring. The chambers are separated from one another by a crease 188 which lies generally in the same plane as the peripheral flange 178. However, the crease 188 is characterized by convex arcuate portions 190 and 192 which closely engage the channels formed in the internal plate 144. The peripheral flange 178 is formed to be substantially in register with the peripheral flange 158 of the external shell 154. As a result, the generally planar peripheral flange 178 of the external shell 156 includes a concave conformal portion 194 which, on the assembled muffler 140, will be in register with the peripheral concave conformal portion 174 of the opposed external shell 154.

Figure 12:
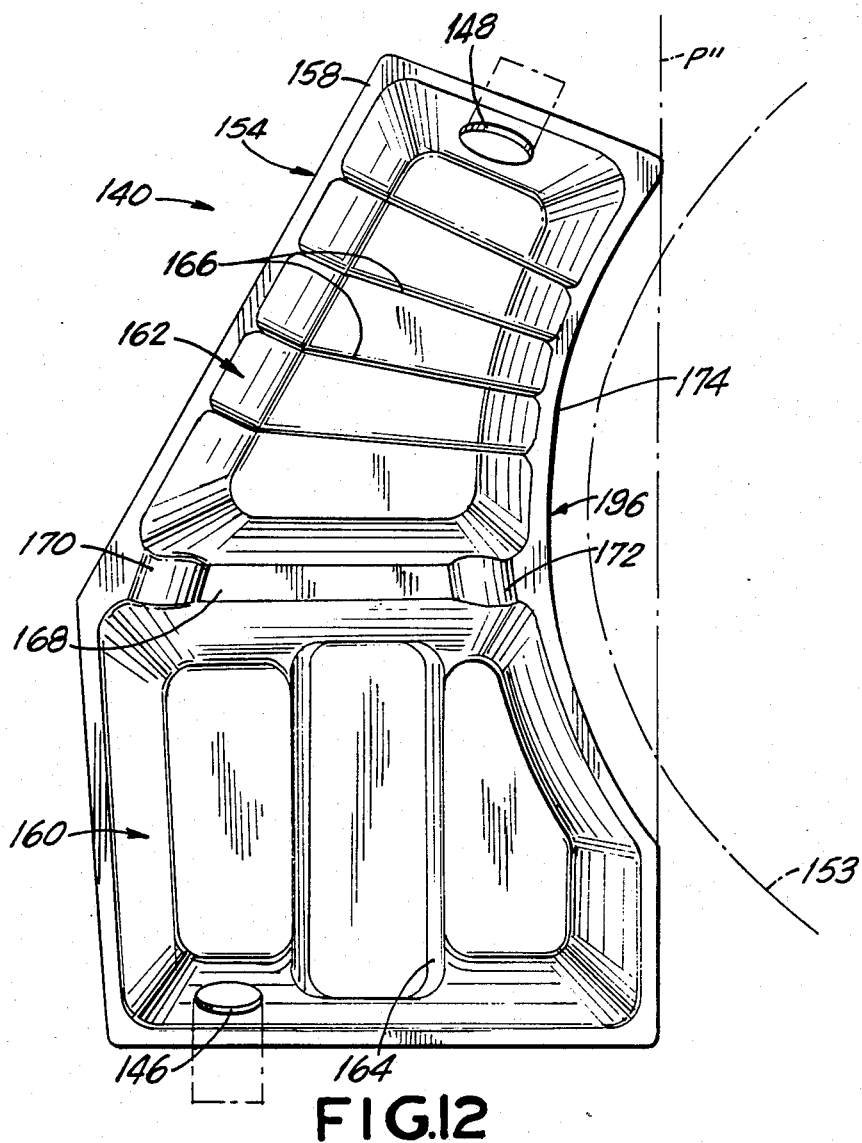
FIG. 12 is a top plan view of the muffler shown in FIG. 11.
Figure 13:
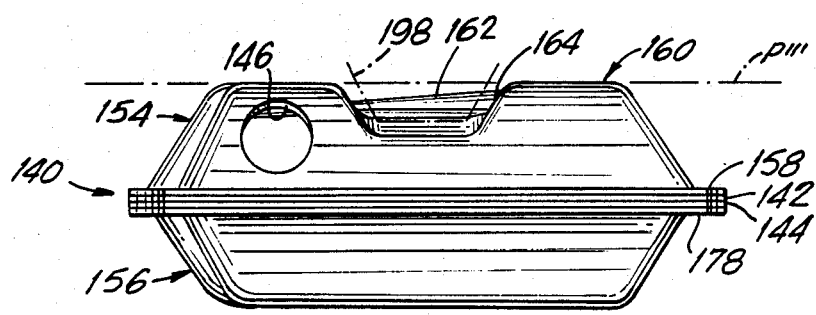
FIG. 13 is a side elevational view of the muffler shown in FIG. 11, as viewed from the left side of FIG. 11.
Figure 14:
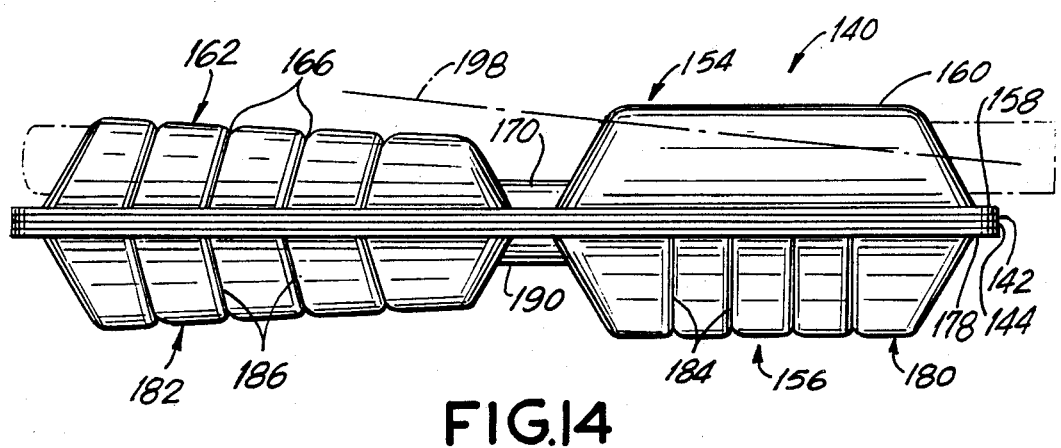
FIG. 14 is a rear elevational view of the muffler shown in FIG. 11.
Figure 15:
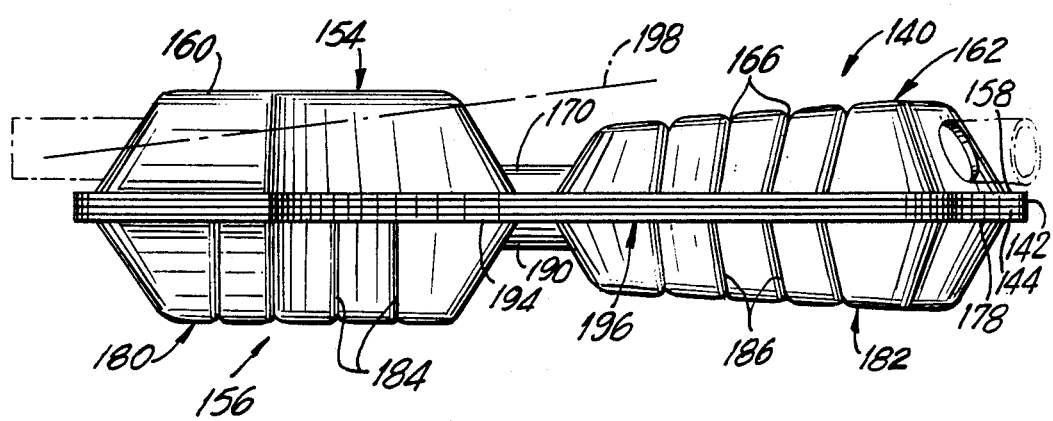
FIG. 15 is a front elevational view of the muffler shown in FIG. 11.
Figure 16:
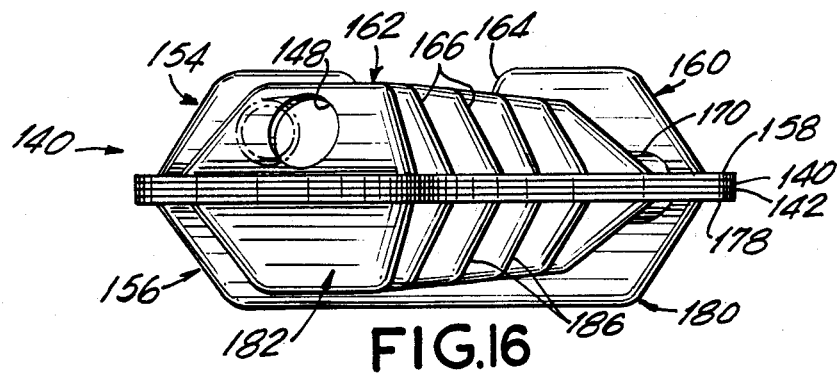
FIG. 16 is a side elevational view of the muffler shown in FIG. 11, as viewed from the right side of FIG. 11.

The muffler 140 is assembled in substantially the same manner as the mufflers described and illustrated above. In particular, the internal plates 142 and 144 are initially secured in face-to-face relationship by, for example, spot welding at a plurality of locations about the internal plates 142 and 144. The external shells 154 and 156 are then securely connected to one another about the internal plates 142 and 144 such that the peripheral flanges 158 and 178 define generally parallel planes on opposed sides of the internal plates 142 and 144. In the assembled condition of the muffler 140, the concave conformal peripheral portions 150 and 152 of the internal plates 142 and 144 and the concave conformal peripheral flange portions 174 and 194 of the external shells 154 and 156 respectively are in register with one another and are secured to one another. This assembly of registered conformal edges is identified generally by the numeral 196. This assembly of conformal peripheral edges 196, as shown in FIGS. 12 and 17 are configured to substantially conform to the shape of a convex structural component 153 on a vehicle, such as a spare tire well. As with the above described embodiments, a plane P" connecting spaced apart locations on the assembly of concave conformal peripheral portions 196 will pass through at least the specified interference zone surrounding the convex vehicular component 153, and as shown in FIGS. 12 and 17 will further pass directly through the actual convex vehicular component 153. Additionally, as shown in FIGS. 13-15, the concave conformal portion 164 formed in the chamber 160 of the external shell 154 also conforms to the shape of a convex structural component 198 on the vehicle. As a result, a plane P''' connecting spaced apart locations on the conformal portion 164 will pass through the convex structural component 198 and through an interference zone extending thereabout.

The muffler 140 differs from the conformal mufflers described and illustrated above in that the peripheral portions of the external shells of the muffler do not define convex polygons, but rather include concave conformal peripheral portions which conform to the shape of a convex structural component on a vehicle. The above described embodiments, on the other hand, included their conformal portions entirely within one shell. The muffler 140 further differs from the previously described embodiments in that it includes two separate and entirely independent concave conformal zones for independently conforming to two separate convex structural components on the vehicle. Additionally, it will be noted that the concave conformal areas 196 and 164 on the muffler 140 are of entirely different shapes and extend into entirely different planes. It will be appreciated that the employment of plural concave conformal areas on a muffler will enable the muffler to be nested into complex irregularly shaped areas of a vehicle, thereby greatly facilitating the ability of engineers to achieve the required volume for the muffler within the very limited space available on the underside of the vehicle.

Figure 18:
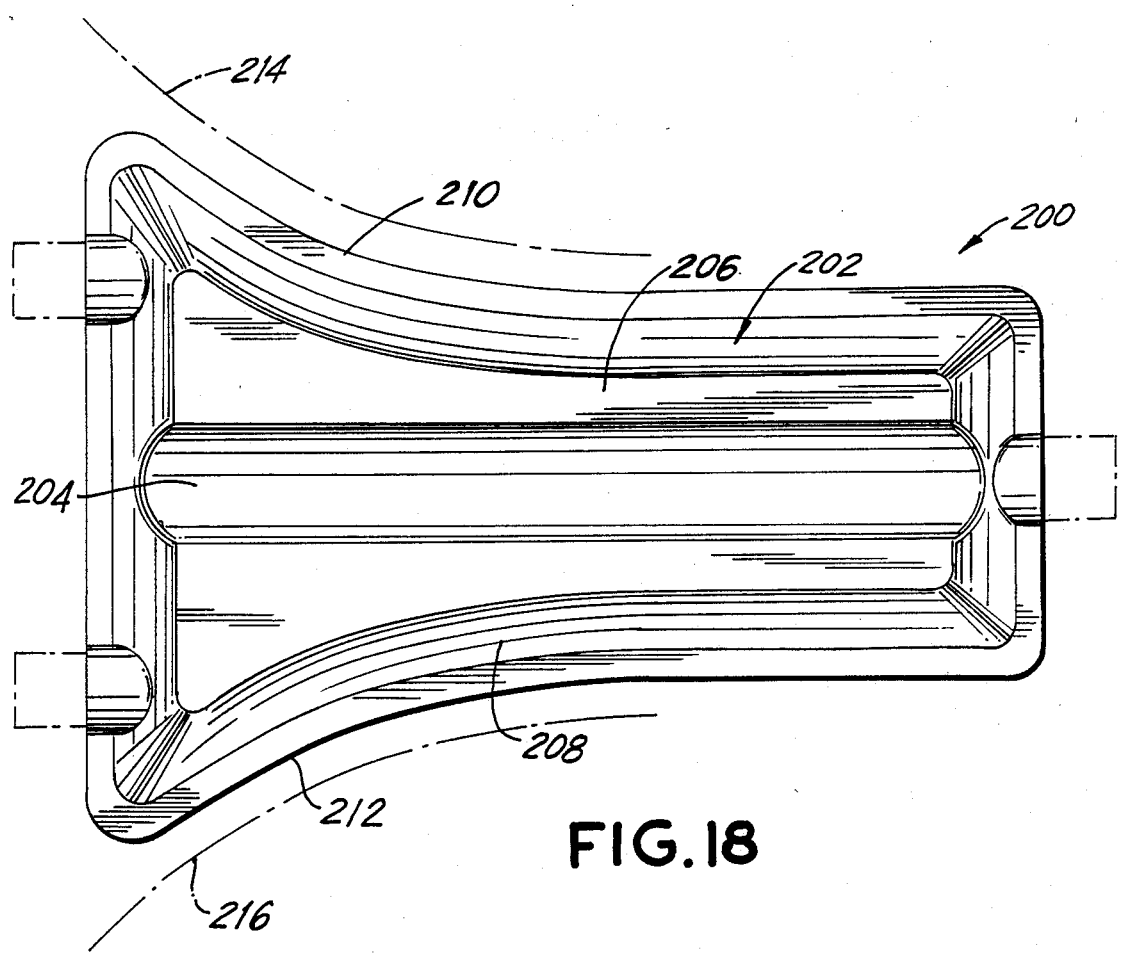
FIG. 18 is a top plan view of a third alternate muffler having a plurality of concave conformal areas.

FIG. 18 illustrates another stamp formed muffler having plural concave conformal areas. In particular, the muffler 200 illustrated in FIG. 18 is structurally similar to the muffler 10 shown in FIGS. 1-6, but has been conformally figured to achieve a larger volume in accordance with particular engine and exhaust flow requirements. In particular, the muffler 200 comprises an upper external shell 202 and a lower external shell (not shown) which are secured to one another along their respective peripheral flanges as described for the previous embodiments. The external shell 202 includes a centrally disposed arcuate convex conformal area 204 extending substantially the entire length thereof to enable the external shell 202 to be placed in nested relationship relative to the drive shaft on the underside of a vehicle as had been explained with respect to the muffler 10 shown in FIGS. 1-6. The external shell 202 further comprises longitudinally extending ridges 206 and 208 which define the limits of the longitudinally extending concave conformal area 204. As described with respect to the muffler 10, a plane extending between the ridges 206 and 208 will pass through the drive shaft and the interference zone extending about the drive shaft. Unlike the muffler 10 illustrated and described above, the muffler 200 is provided with additional concave conformal areas. In particular, the peripheral flanges define concave conformal portions 210 and 212 which are disposed in nested relationship to adjacent structural components 214 and 216 respectively on the vehicle. The components 214 and 216 may define portions of the passenger compartment adjacent the rear seat of the vehicle. It will be noted that lines connecting spaced apart locations on the conformal areas 210 or 212 will pass through the structural components 214 or 216 respectively.

In summary, a stamp formed muffler is provided with a plurality of plates stamped to define an array of tubes therebetween, including at least one inlet and at least one outlet. At least one external shell is secured to one of the stamped plates. The external shell is configured to define at least one chamber which communicates with the array of tubes defined by the plates. The external shell includes a generally concave conformal area which is configured to conform to the shape of a structure on the vehicle. The conformal area of the external shell may comprise an arcuate concave area or an internal corner when viewed from the exterior of the muffler. Thus, a plane extending across the conformal area will pass through at least the interference zone surrounding the structure on the vehicle or through the structure itself. The concave conformal area may be formed entirely within one external shell or may be formed at locations where peripheral portions of two external shells are joined. Plural independent concave conformal portions may also be provided.

While the invention has been described with respect to certain preferred embodiments, it is apparent that various changes can be made without departing from the scope of the invention as defined by the appended claims.

What is claimed is:

1. An exhaust muffler for mounting in proximity to a structure on a vehicle having a convex shape, said muffler comprising:

a plurality of plates secured in face-to-face relationship, said plates comprising peripheral edges and being formed to define at least one inlet, at least one outlet and at least one tube extending therebetween; and an external shell having peripheral edges secured generally in register with the peripheral edges of said plates, portions of said external shell intermediate said peripheral edges being formed to define at least on chamber in communication with said tube, portions of said peripheral edges of said external shell and said plates defining a generally concave conformal area having a shape conforming to at least a portion of said convex shape of said structure, said conformal area being configured such that at least one line connecting spaced apart locations on the peripheral edges of said conformal area passes through said structure when said muffler is mounted to said vehicle.

2. A muffler as in claim 1 wherein the peripheral edges of said generally concave conformal area are of generally arcuate configuration.

3. A muffler as in claim 1 wherein the peripheral edges of said conformal area are configured to be approximately uniformly spaced from said structure of said vehicle by a distance approximately equally to a minimum acceptable clearance between said structure and said muffler to define an interference zone between said structure and said muffler.

4. A muffler as in claim 1 wherein the concave conformal area defines a first concave conformal area, said muffler further comprising at least a second concave conformal area configured to conform to a second generally convex structure on the vehicle such that a line connecting spaced apart locations on said second concave conformal area passes through the second structure on the vehicle.

5. A muffler as in claim 4 wherein the second concave conformal area is spaced from the peripheral edges.

6. A muffler as in claim 5 wherein the second concave conformal area is defined by portions of the peripheral edges spaced from the portions of the peripheral edges defining the first concave conformal area.

7. An exhaust muffler as in claim 1 wherein portions of the peripheral edges defining the conformal area are generally planar.

8. An exhaust muffler for mounting in proximity to a generally arcuate structure on a vehicle having a generally convex arcuate shape, said muffler comprising:
a pair of plates secured in face-to-face relationship, said plates comprising peripheral edges and being formed to define at least one inlet, at least one outlet and at least one tube extending therebetween; and
at least one external shell having peripheral edges secured generally in register with the peripheral edges of said plates, portions of said external shell intermediate said peripheral edges being formed to define at least one chamber in communication with said tube, portions of the peripheral edges of said external shell and of said plates defining an inwardly concave arcuate conformal area having a shape generally conforming to the shape of at least a portion of said arcuate structure of said vehicle and spaced therefrom to define an interference zone between said arcuate structure and said muffler such that chordal lines extending between selected points on said concave conformal area of said peripheral edges of said external shell and said plates pass through said interference zone when said muffler is mounted to said vehicle.

9. A muffler as in claim 8 wherein selected ones of said chordal lines extend through said arcuate structure.

10. A muffler as in claim 8 wherein the concave conformal area defines a first concave conformal area, said muffler further comprising at least a second concave conformal area configured to conform to at least a second generally convex arcuate structure on the vehicle and spaced therefrom to define at least a second interference zone, such that lines extending between spaced apart locations on the second conformal area passes through the second interference zone.

11. A muffler as in claim 10 comprising second and third concave conformal areas.

12. A muffler as in claim 10 wherein said second concave conformal area is defined by portions of the peripheral edges of said muffler spaced from portions of the peripheral edges defining the first conformal area.

13. An exhaust muffler as in claim 8 wherein portions of the peripheral edges defining the conformal area are generally planar.

14. An exhaust muffler for mounting on the underside of a vehicle and in proximity to a spare tire well of said vehicle, said spare tire well comprising at least one portion defining an outwardly directed arcuate shape, said muffler comprising:
a pair of plates secured in juxtaposed relationship, said plates comprising peripheral edges and being formed to define at least one inlet, at least one outlet and at least one tube extending therebetween; and
at least one external shell having peripheral edges secured generally in register with the peripheral edges of at least one of said plates, said external shell being formed to comprise at least one chamber, said peripheral edges of said external shell and said internal plates being formed to define an inwardly directed conformal area substantially conforming to the shape of the outwardly directed arcuate portion of said spare tire well.

15. An exhaust muffler as in claim 14 wherein said vehicle further comprises a structure spaced from the spare tire well and having a generally convex shape, said external shell comprising a second conformal area conforming to the convex shape of said structure, such that a line connecting spaced apart locations on said second conformal area passes through the structure of said vehicle.

16. An exhaust muffler for mounting in proximity to first and second structures on a vehicle having convex shapes, said muffler comprising:
an array of tubes comprising at least one inlet and at least one outlet for said muffler; and
a pair of external shells having peripheral edges and being secured to one another at said peripheral edges and around said array of tubes, portions of said peripheral edges comprising a first generally concave conformal area conforming to the convex shape of at least a portion of the first structure, said muffler further comprising a second concave conformal area conforming to the convex shape of the second structure, whereby said conformal areas can be disposed in generally nested relationship to said structures when said muffler is mounted to said vehicle.

17. A muffler as in claim 16 wherein said first conformal area is of generally arcuate concave configuration.

18. A muffler as in claim 16 wherein said first conformal area is configured to be approximately uniformly spaced from said first structure when said muffler is mounted on said vehicle.

* * * * *